(12) United States Patent
Chiu et al.

(10) Patent No.: US 9,338,475 B2
(45) Date of Patent: May 10, 2016

(54) TONE MAPPING FOR BIT-DEPTH SCALABLE VIDEO CODEC

(75) Inventors: Yi-Jen Chiu, San Jose, CA (US); Lidong Xu, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 2520 days.

(21) Appl. No.: 12/148,131

(22) Filed: Apr. 16, 2008

(65) Prior Publication Data

US 2009/0262798 A1   Oct. 22, 2009

(51) Int. Cl.

| | |
|---|---|
| *H04N 19/80* | (2014.01) |
| *H04N 19/46* | (2014.01) |
| *H04N 19/30* | (2014.01) |
| *H04N 19/117* | (2014.01) |
| *H04N 19/14* | (2014.01) |
| *H04N 19/186* | (2014.01) |
| *H04N 19/182* | (2014.01) |
| *H04N 19/184* | (2014.01) |
| *H04N 19/187* | (2014.01) |
| *H04N 19/44* | (2014.01) |

(52) U.S. Cl.
CPC ............. *H04N 19/80* (2014.11); *H04N 19/117* (2014.11); *H04N 19/14* (2014.11); *H04N 19/182* (2014.11); *H04N 19/184* (2014.11); *H04N 19/186* (2014.11); *H04N 19/187* (2014.11); *H04N 19/30* (2014.11); *H04N 19/44* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 7,983,496 B2 | 7/2011 | Liu | |
| 8,014,445 B2 * | 9/2011 | Segall et al. | 375/240.01 |
| 8,085,852 B2 * | 12/2011 | Liu | H04N 19/105 358/1.9 |
| 8,208,560 B2 * | 6/2012 | Chiu et al. | 375/240.25 |

FOREIGN PATENT DOCUMENTS

| | | |
|---|---|---|
| DE | 10 2008 051 562 | 4/2009 |
| EP | 2 109 321 | 10/2009 |
| WO | 2007/082562 | 7/2007 |
| WO | 2008/019524 | 2/2008 |

OTHER PUBLICATIONS

European Patent Office, Combined Search and Examination Report for EP Application No. 09157980.5, dated Jun. 30, 2010, 12 pgs.
Winken M et al: "CE2: SVC bit-depth scalability" 24. JVT Meeting; 81. MPEG Meeting; Jun. 29, 2007-May 7, 2007; Geneva, CH; (Joint Video Team of ISO/IEC JTC1/SC29/WG11 and ITU-T Sg.16 ),, Jul. 4, 2007, XP030007164.

(Continued)

*Primary Examiner* — Geepy Pe
(74) *Attorney, Agent, or Firm* — Trop Pruner & Hu, P.C.

(57) ABSTRACT

A scalable video codec may convert lower bit depth video to higher bit depth video using decoded lower bit depth video for tone mapping and tone mapping derivation. The conversion can also use the filtered lower bit depth video for tone mapping and tone mapping derivation.

27 Claims, 3 Drawing Sheets

(56) References Cited

OTHER PUBLICATIONS

Richardson I E G Ed-Richardson I E G: "H.264 and MPEG-4 Video Compression, video coding for next-generation multimedia, passage" Jan. 1, 2003, H.264 and MPEG-4 Video Compression : Video Coding for Next Generation Multimedia, Hoboken, NJ : John Wiley & Sons, US, p. 184-187, XP002581441 ISBN: 0470848375, pp. 184-187 * p. 184-p. 187*.

Chinese Patent Office, Chinese Office Action Report (with English translation) issued in corresponding CN Application No. 200910132752.2, dated Dec. 14, 2010, 12 pgs.

Winken et al., "SVC bit depth scalability", JVT document JVT-V078, Joint Video Team (JVT) of ISO/IEC JTC1/SC29/ WG11 & ITU-T SG16 Q.6, Marrakech, Morocco, Jan. 2007.

Segall et al., "System for Bit-Depth Scalable Coding", JVT document JVT-W113, Joint Video Team (JVT) of ISO/IEC JTC1/SC29/ WG11 & ITU-T SG16 Q.6, San Jose, California, USA, Apr. 2007.

Liu et al., "Inter-layer Prediction for SVC Bit-depth Scalability", JVT document JVT-X075, Joint Video Team (JVT) of ISO/IEC JTC1/SC29/WG11 & ITU-T SG16 0.6, Geneva, Switzerland, Jun. 2007.

Gao et al., "Applications and Requirement for Color Bit Depth Scalability", JVT document JVT-U049, Joint Video Team (JVT) of ISO/IEC JTC1/SC29/WG11 & ITU-T SG16 Q.6, Hangzhou, China, Oct. 2006.

Yu et al., "Improving Compression Preformance in Bit Depth SVC with a Prediction Filter", JVT document JVT-Z045, Joint Video Team (JVT) of ISO/IEC JTC1/SC29NVG11 & ITU-T SG16 Q.6, Antalya, Turkey, Jan. 2008.

\* cited by examiner

TONE MAPPING FOR BIT-DEPTH SCALABLE VIDEO CODEC

BACKGROUND

This relates generally to scalable video codecs.

Scalable video codecs enable different picture quality levels to be delivered to different customers, depending on what type of service they prefer. Lower quality video services may be less expensive than higher quality video services.

In a scalable video coder, a lower bit depth may be called a baseline layer and a higher bit depth may be called an enhancement layer. The greater the bit depth, the better the quality of the video.

In a scalable video codec, an encoder and decoder may be provided as one unit. In some cases, only an encoder may be provided and, in other cases, only a decoder may be provided. The scalable video coder enables the system to operate with at least the baseline layer. Thus, in low cost systems, only the baseline layer may be utilized and, in higher cost, more advanced systems, the enhancement layer may be utilized.

It is advantageous to derive the enhancement layer from the baseline layer. To this end, inverse tone mapping may be utilized to increase the bit depth of the baseline layer to the bit depth of the enhancement layer. In some cases, for example, the baseline layer may be 8 bits per pixel and the enhancement may be 10, 12, or higher bits per pixel.

DETAILED DESCRIPTION

Figure 1:
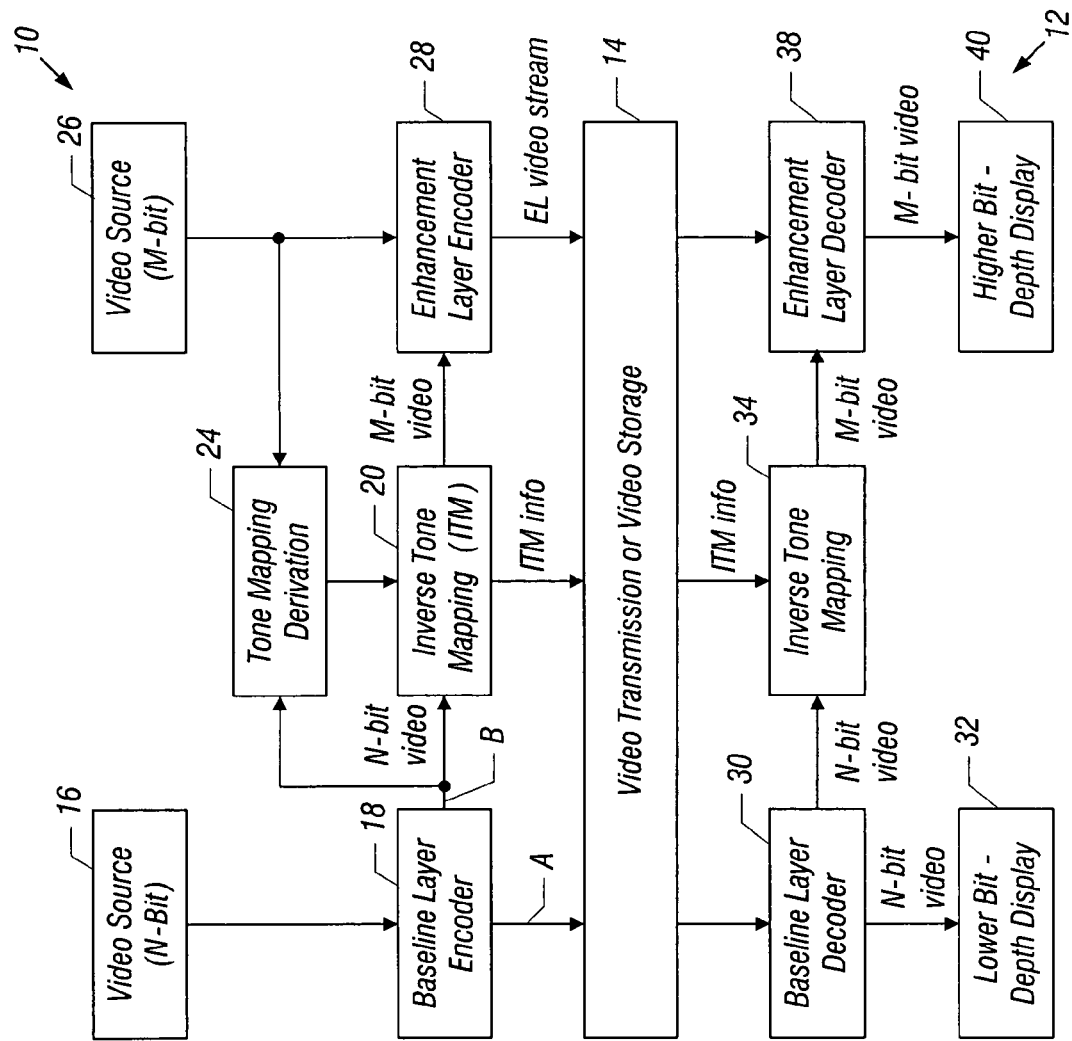
FIG. 1 is a schematic depiction of an encoder and decoder system in accordance with one embodiment of the present invention.

Referring to FIG. 1, a scalable video codec includes an encoder 10 that communicates over a video transmission or a video storage 14 with a decoder 12. FIG. 1 shows an encoder from one codec with a decoder from another codec.

As an example, a network computer may communicate over the network with another computer. Each computer may have a codec which includes both an encoder and a decoder so that information may be encoded at one node, transmitted over the network to the other node, which then decodes the encoded information.

The codec shown in FIG. 1 is a scalable video codec (SVC). This means that it is capable of encoding and/or decoding information with different bit depths. Video sources 16 and 26 may be connected to the encoder 10. The video source 16 may use N-bit video data, while the video source 26 may provide M-bit video data, where the bit depth M is greater than the bit depth N. In other embodiments, more than two sources with more than two bit depths may be provided.

In each case, the information from a video source is provided to an encoder. In the case of the video source 16, of lower bit depth, the information is provided to a baseline encoder 18. In the case of the video source 26, of higher bit depth, an enhancement layer encoder 28 is utilized.

However, baseline decoded information at B from the baseline encoder 18 is inverse tone mapped to increase its bit depth to M-bits for use in enhancement layer encoding. Thus, the decoded N-bit video is provided, in one embodiment, to an inverse tone mapping unit 20. The inverse tone mapping 20 increases the bit depth and produces an M-bit output to the enhancement layer encoder 28. The decoded stream B is also presented for tone mapping derivation 24. The tone mapping derivation 24 also receives information from the M-bit video source 26. The output of the tone mapping derivation 24 is used for inverse tone mapping 20.

At the same time, the encoded output at A from the encoder 18 is output to the video transmission or storage 14.

As a result of the use of the decoded stream B for tone mapping derivator 24, the coding residual in the enhancement layer encoder 28 may be reduced, improving coding efficiency, in some cases, because of a better prediction in the encoder 28.

The encoder of FIG. 1 may be consistent with the H.264 (advanced video codec (AVC) and MPEG-4 Part 10), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). H.264 is designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with H.264 video coding, the present invention is not so limited. Instead, embodiments may be used in a variety of video compression systems including MPEG-2 (ISO/IEC 13818-1 (2000) MPEG-2 available from International Organization for Standardization, Geneva, Switzerland) and VC1 (SMPTE 421M (2006) available from SMPTE White Plains, N.Y. 10601).

The encoder provides information over the video transmission or video storage 14 for use by a decoder. The information that may be provided may include the baseline (BL) layer video stream, the inverse tone mapping (ITM) information, the filter taps from the adaptive filtering 24, and the enhancement layer (EL) video stream. Some of this information may be included in a packet header. For example, the inverse tone mapping (ITM) information and the filter tap information may be provided in an appropriate header in packetized data transmission.

Upon receipt of the appropriate information in the decoder 12, the baseline decoder 30 decodes the information for N-bit video display by the display 32. However, if, instead, enhancement layer equipment is provided, a higher bit depth display 40 may be provided. (Generally, two displays would not be included). The baseline decoder output, which is N-bits, is converted to M-bit video using inverse tone mapping unit 34, which is also fed ITM information about the inverse tone mapping that was done in the encoder 10.

The video decoder is self-deriving since information available to the decoder is used to encode. This same information can be accessed by the decoder to decode the encoded information without seeking that information from the encoder.

In general, any type of tone mapping may be utilized to increase the bit density of the baseline layer video including inverse block-based scaling and inverse piecewise linear mapping.

The tone mapping derivation 24 in FIG. 1 finds the relationship among higher/lower bit depth video. Usually, the mapping relationship is derived through the statistical feature from the original high bit depth video and the original lower bit depth video at the encoder side.

A look-up table (LUT) is built using a pixel x of the lower bit depth N input and the co-located pixel y of the higher bit depth M input. By "co-located" it is intended to refer to a pixel in the same locations in the two pictures from the sources 16 and 26.

For every pixel $x_i$ in the lower bit depth input and the co-located pixel $y_i$ in higher bit depth input, let $$sum_k \mathrel{+}= \sum_i y_i \bigg|_{(x_i=k)}$$

$$num_k \mathrel{+}= \sum_i 1 \bigg|_{(x_i=k)}$$

then, the $j^{th}$ entry of $LUT[j]=sum_j/num_j$

If ($num_j==0$), then LUT[j] is the weighted average of LUT $[j_-]$ and $LUT[j_+]$ where $j_-$ and $j_+$, if available, are the closest non-zero neighbors to the $j^{th}$ entry.

Instead of using the input pixel of the lower bit depth source 16, the decoded output pixel from the base layer encoder 18 is used with the input of the higher bit depth source 26 to work out the mapping LUT. The pixel z is the decoded lower bit depth N output and the co-located input pixel y is the higher bit depth M input. For every pixel $z_i$ in the lower bit depth decoded output and the co-located pixel $y_i$ in the higher bit depth input, let $$sum_k \mathrel{+}= \sum_i y_i \bigg|_{(z_i=k)}$$

$$num_k \mathrel{+}= \sum_i 1 \bigg|_{(z_i=k)}$$

then, the $j^{th}$ entry of $LUT[j]=sum_j/num_j$

If ($num_j==0$), then LUT[j] is the weighted average of LUT $[j_-]$ and $LUT[j_+]$ where $j_-$ and $j_+$, if available, are the closest non-zero neighbors to the $j^{th}$ entry.

Figure 2:
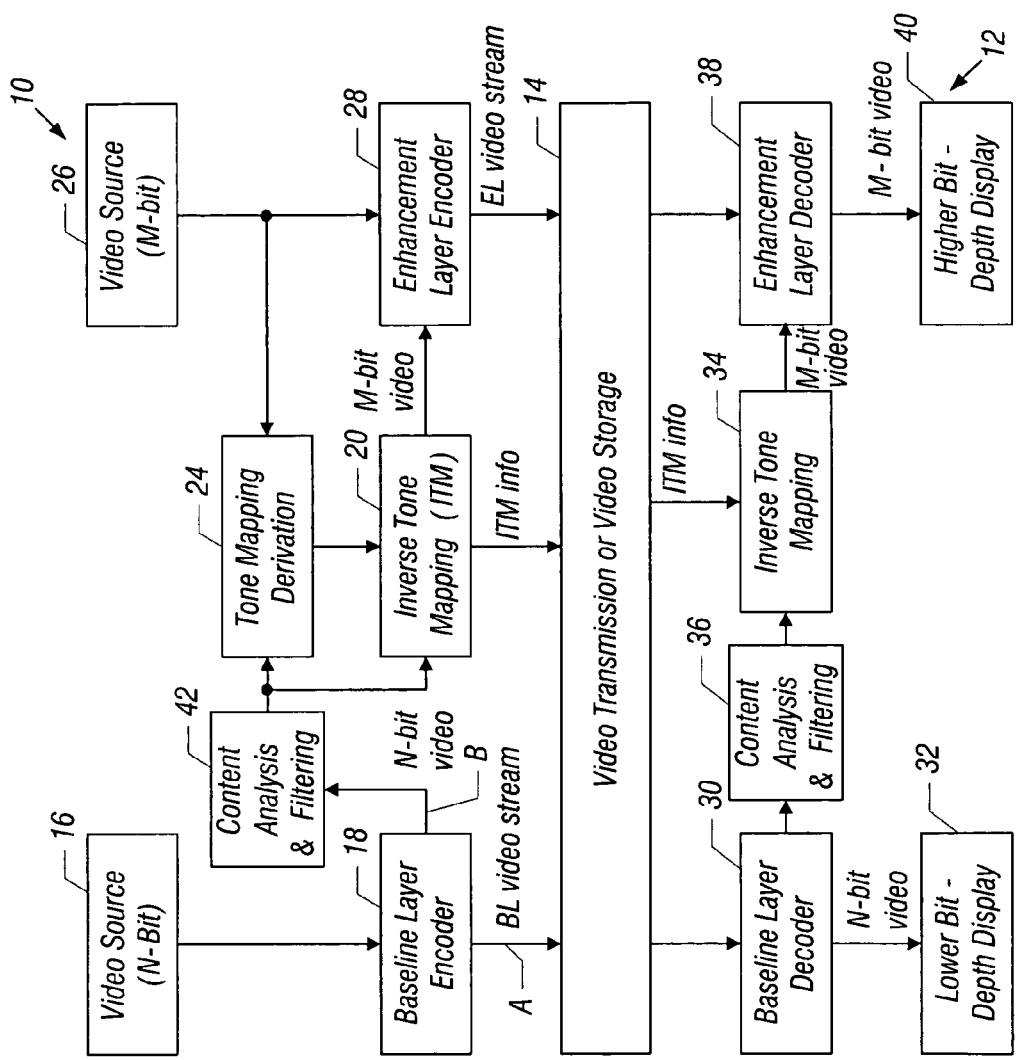
FIG. 2 is a depiction of an encoder and decoder system in accordance with another embodiment of the present invention.

In FIG. 2, a content adaptive technique using content analysis and filtering 42, derives the tone mapping LUT. The pixel z is the decoded lower bit depth N output and the co-located input pixel y is from the higher bit depth M. If there are no edge pixels in the neighborhood surrounding to the target pixel z, then the target pixel z may be replaced with the filtered pixel f to derive the tone mapping LUT.

For every pixel $x_i$ in the lower bit depth decoded output and the co-located pixel $y_i$ in higher bit depth input, if there is no edge pixel in the neighborhood of $x_i$:

$$\text{set } f_i = \text{filter}(x_i)$$

$$sum_k \mathrel{+}= \sum_i y_i \bigg|_{(f_i=k)}$$

$$num_k \mathrel{+}= \sum_i 1 \bigg|_{(f_i=k)}$$

The $j^{th}$ entry of $LUT[j]=sum_j/num_j$

If ($num_j==0$), then LUT[j] is the weighted average of LUT $[j_-]$ and $LUT[j_+]$ where $j_-$ and $j_+$, if available, are the closest non-zero neighbors to the $j^{th}$ entry.

The Sobel edge operator is used for the content analysis and filtering 42 in one embodiment. Given the target pixel z:

$$E\_h = \begin{bmatrix} -1 & -2 & -1 \\ 0 & 0 & 0 \\ 1 & 2 & 1 \end{bmatrix} \quad E\_v = \begin{bmatrix} -1 & 0 & 1 \\ -2 & 0 & 2 \\ -1 & 0 & 1 \end{bmatrix}$$

$$E\_P45 = \begin{bmatrix} -2 & -1 & 0 \\ -1 & 0 & 1 \\ 0 & 1 & 2 \end{bmatrix} \quad E\_N45 = \begin{bmatrix} 0 & -1 & -2 \\ 1 & 0 & -1 \\ 2 & 1 & 0 \end{bmatrix}$$

The edge metric (EM) for the target pixel z is formulated as the convolution of the weighting in the equation below with its 3×3 neighborhood, NH9(z), as: EM(z)=|NH9(z)*E_h|+|NH9(z)*E_v|+|NH9(z)*E_P45|+|NH9(z)*E_N45|

The use of two directions, E_v, and E_h may be sufficient for many applications. The detection at 45 degrees further improves the edge detection, but with more computational complexity.

Other content analysis techniques may be used for edge detection such as the Canny algorithm and the derivative-based algorithm.

In FIG. 2, the target pixel is filtered with the filter support coming from the neighborhood pixels. A linear filter or an average filter may be used with the edge detector in some embodiments.

The definition of neighborhood may be naturally aligned with the definition of the block size specified in the popular video coding standard such as SVC and H.264. The block size can be 4×4, 8×4, 4×8, and 8×8, as examples. With this alignment, the tone mapping derivation 24 is content adaptive and block-based. While a 3×3 neighborhood may be used, other neighborhood pixels may also be used.

The tone mapping table may be derived based on the luma and chroma channels respectively. The luma LUT may be used for the mapping of luma pixels and the chroma LUT may be used for mapping of chroma pixels. In some scenarios, the one chroma table is shared by both Cb and Cr channels, or two individual tables for Cb and Cr, respectively, may be used.

In some embodiments, the tone mapping relationship is used to predict the pixels of the higher bit depth by the use of the decoded pixels of lower bit depth and the co-located input pixels of higher bit depth. Through the use of the decoded pixels of the lower bit depth, instead of the input pixels of the lower bit depth, the coding residual is reduced and better coding efficiency is achieved in some embodiments.

Content adaptive techniques utilize the neighboring pixels to produce the filtered pixel as a substitute for the non-filtered decoded pixel to derive the tone mapping relationship. With the use of the neighborhood analysis, pixels on the other edge are eliminated in order to produce smoother pixels and to better predict the higher bit depth pixels in some embodiments. Thus, more efficient coding efficiency is accomplished in some cases. Because of the resulting self-derivation, at the video decoder side, no extra overhead is required to transmit from the video encoder side to video decoder side in some embodiments.

Figure 3:
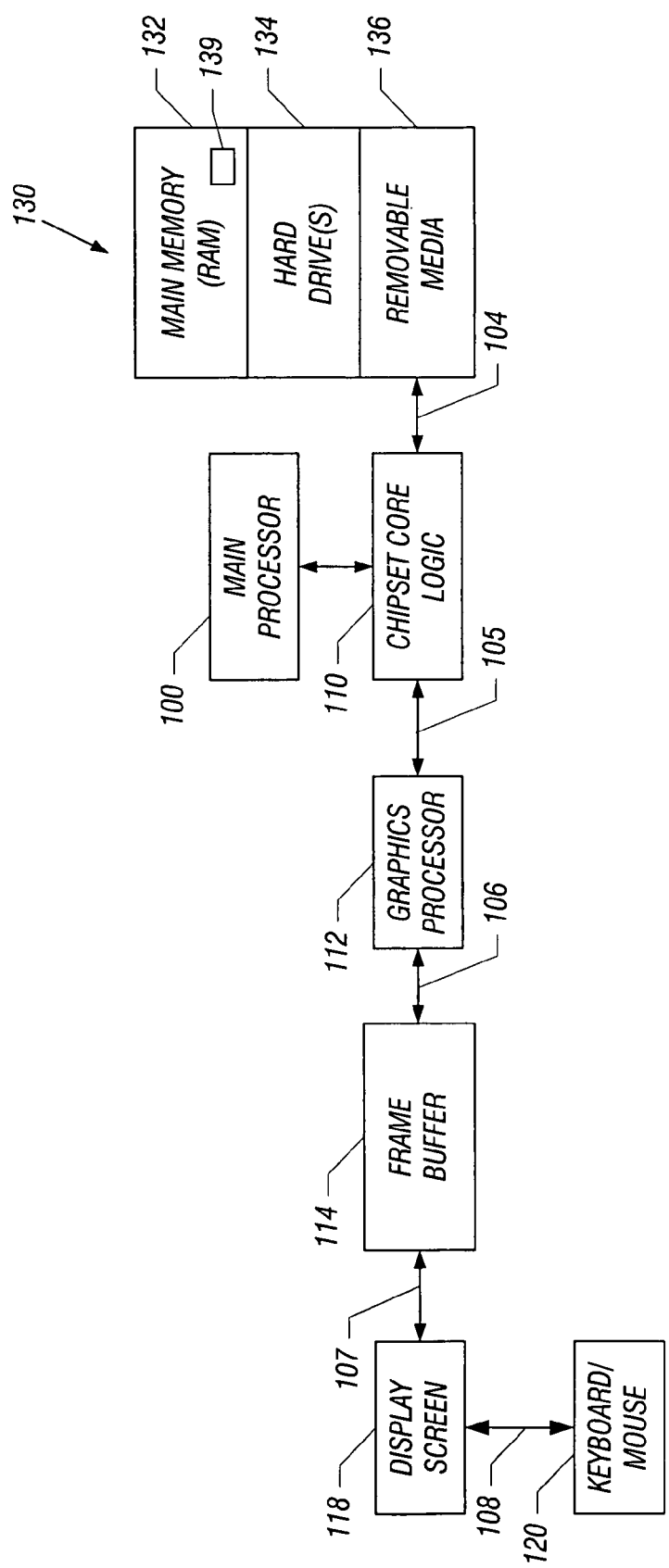
FIG. 3 is a system depiction for still another embodiment of the present invention.

Referring to FIG. 3, the encoders and decoders depicted in FIGS. 1 and 2 may, in one embodiment, be part of a graphics processor 112. In some embodiments, the encoders and decoders shown in FIGS. 1 and 2 may be implemented in hardware and, in other embodiments, they may be implemented in software or firmware. In the case of a software implementation, the pertinent code may be stored in any suitable semiconductor, magnetic or optical memory, including the main memory 132. Thus, in one embodiment, source code 139 may be stored in a machine readable medium, such as main memory 132, for execution by a processor, such as the processor 100 or the graphics processor 112.

A computer system 130 may include a hard drive 134 and a removable medium 136, coupled by a bus 104 to a chipset core logic 110. The core logic may couple to the graphics processor 112 (via bus 105) and the main processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

The blocks indicated in FIGS. 1 and 2 may constitute hardware or software components. In the case of software components, the figures may indicate a sequence of instructions that may be stored in a computer readable medium such as a semiconductor integrated circuit memory, an optical storage device, or a magnetic storage device. In such case, the instructions are executable by a computer or processor-based system that retrieves the instructions from the storage and executes them. In some cases, the instructions may be firmware, which may be stored in an appropriate storage medium. One result of the execution of such instructions is the improvement of quality of pictures that are ultimately displayed on a display screen.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    using decoded, lower bit depth video for inverse tone mapping for higher bit depth encoding; and
    using an analysis of neighboring pixels for inverse tone mapping.

2. The method of claim 1 including increasing the bit depth of encoded baseline layer video information.

3. The method of claim 2 including providing said increased bit depth video information to an enhancement layer encoder.

4. The method of claim 1 including using self-deriving decoding.

5. The method of claim 1 including using a decoded, lower bit depth video for tone mapping derivation.

6. The method of claim 1 including using a decoded output of a baseline layer encoder for inverse tone mapping.

7. The method of claim 1 including using co-located pixels in lower and higher bit depth video for tone mapping derivation.

8. The method of claim 1 including using filtered pixels in lower bit depth video for tone mapping derivation.

9. The method of claim 1 including filtering the decoded, lower bit depth video before inverse tone mapping.

10. The method of claim 1 including developing a tone mapping look-up table with said neighboring pixels and co-located pixels in said lower and higher bit depth video.

11. An apparatus comprising:
    a lower bit depth encoder having encoded and decoded video outputs;
    a device to increase the bit depth of encoded video information using video from said decoded video output; and
    an inverse tone mapper to analyze neighboring pixels.

12. The apparatus of claim 11 wherein said device includes an inverse tone mapper.

13. The apparatus of claim 11 wherein said apparatus is an encoder.

14. The apparatus of claim 11 wherein said apparatus includes a decoder.

15. The apparatus of claim 14 wherein said decoder is self-deriving.

16. The apparatus of claim 11 including a baseline encoder coupled to said device.

17. The apparatus of claim 12 including a filter to filter said decoded video output.

18. The apparatus of claim 17 including an enhancement layer encoder coupled to said filter.

19. The apparatus of claim 18 including an inverse tone mapper and a tone mapper derivation, wherein an output of said filter is coupled to the inverse tone mapper and the tone mapper derivation.

20. A video encoder comprising:
    a baseline layer encoder having a decoded output;
    an inverse tone mapper to use neighboring pixel analysis coupled to said decoded output; and
    an enhancement layer encoder coupled to said inverse tone mapper.

21. The encoder of claim 20 including a tone mapper derivation coupled to said baseline layer encoder, said tone mapper derivation coupled to said inverse tone mapper and to a source of enhancement layer video.

22. The encoder of claim 21 wherein said inverse tone mapper derivation to develop a tone mapper look-up table using pixels in a baseline layer video and an enhancement layer video.

23. The encoder of claim 21, said inverse tone mapper to use co-located pixels in said baseline layer and said enhancement layer video.

24. The encoder of claim 22, said inverse tone mapper derivation to develop a tone mapper look-up table using neighboring pixels in said baseline layer video and said enhancement layer video.

25. The encoder of claim 20 including a filter coupled to said decoded output.

26. The encoder of claim 25 wherein said inverse tone mapper is coupled to an output of said filter.

27. The encoder of claim 26 including a tone mapper derivation coupled to the output of said filter.

* * * * *